United States Patent [19]
Grinderslev et al.

[11] Patent Number: 6,019,519
[45] Date of Patent: Feb. 1, 2000

[54] FLOATING OPTICAL CONNECTOR BODY AND AN OPTICAL CONNECTOR

[75] Inventors: Soren Grinderslev, Hummelstown; Daniel Erlin Wertman, Mechanicsburg, both of Pa.

[73] Assignee: The Whitaker Corporation, Wilmington, Del.

[21] Appl. No.: 08/959,312

[22] Filed: Oct. 28, 1997

Related U.S. Application Data

[60] Provisional application No. 60/054,800, Jul. 31, 1997.

[51] Int. Cl.⁷ .................................................. G02B 6/38
[52] U.S. Cl. ............................................................. 385/56
[58] Field of Search .................................. 385/55, 56, 59, 385/60, 72, 78, 80, 85, 76, 66, 84, 58; 439/369

[56] References Cited

U.S. PATENT DOCUMENTS

| | | |
|---|---|---|
| 4,611,887 | 9/1986 | Glover et al. ............................. 385/88 |
| 4,687,291 | 8/1987 | Stape et al. ........................... 350/96.21 |
| 4,735,480 | 4/1988 | Levinson et al. .......................... 385/89 |
| 4,781,431 | 11/1988 | Wesosn et al. ...................... 350/96.21 |
| 4,826,277 | 5/1989 | Weber et al. ........................ 350/96.23 |
| 4,913,514 | 4/1990 | Then ..................................... 350/96.21 |
| 5,125,056 | 6/1992 | Hughes et al. ............................ 385/59 |
| 5,418,876 | 5/1995 | Lee .......................................... 385/80 |

FOREIGN PATENT DOCUMENTS

| | | |
|---|---|---|
| 61 217008 | 9/1986 | Japan . |
| 2 111 243 | 6/1983 | United Kingdom . |

OTHER PUBLICATIONS

Document Number vol. 013 No. 261 P885 Mar. 2, 1989, jpx.

*Primary Examiner*—Akm E. Ullah

[57] ABSTRACT

Optical fibers (7) within alignment ferrules (6) are aligned by a connector body (1) that is supported by a resilient member (17) in floating suspension within a wall (23) of a connector (20), and a mating end (2) of the connector body (1) is sealed by the resilient member (17) and by seals (16) encircling the alignment ferrules (6).

12 Claims, 8 Drawing Sheets

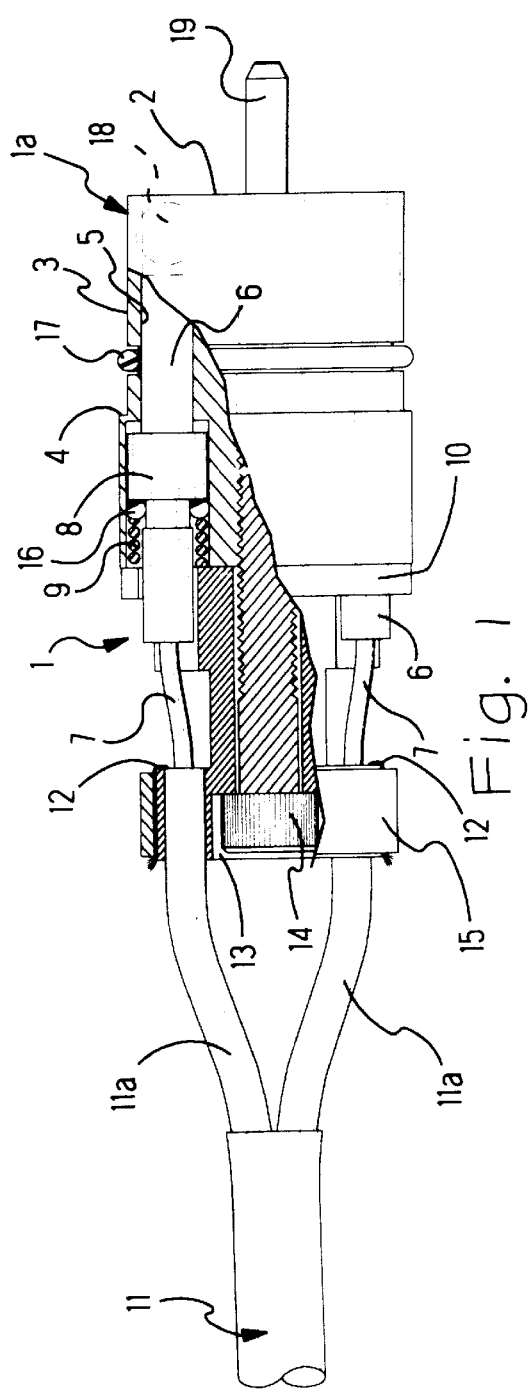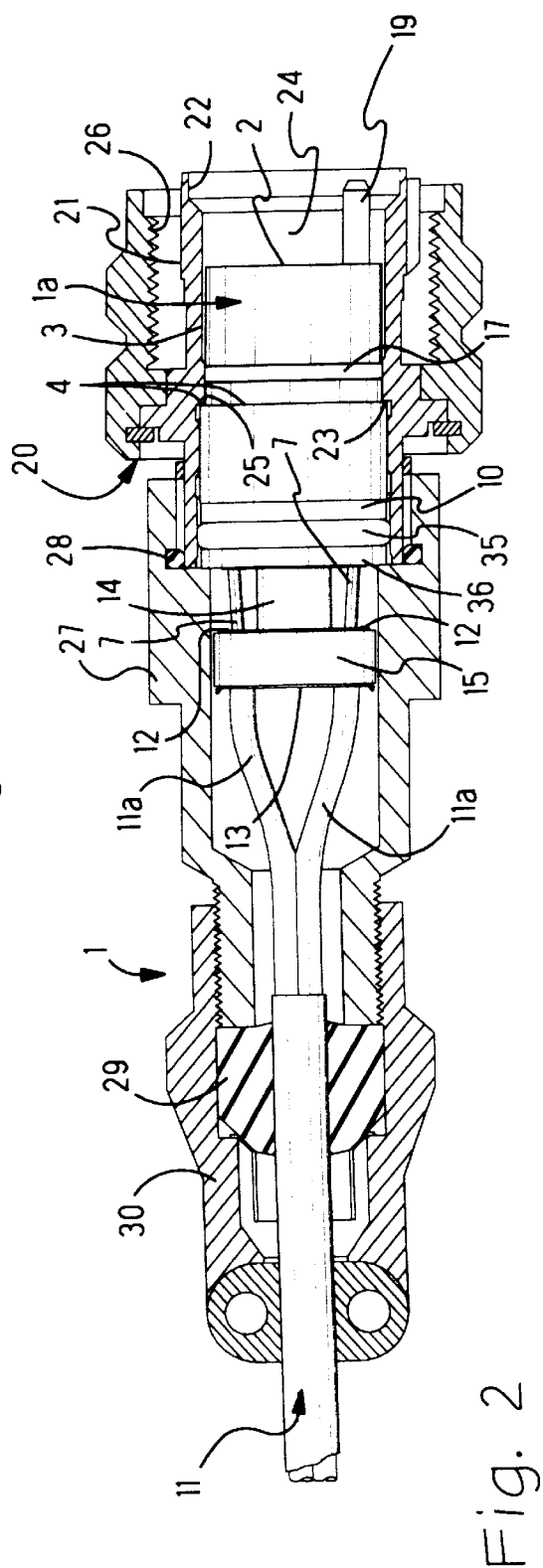

FLOATING OPTICAL CONNECTOR BODY AND AN OPTICAL CONNECTOR

This application claims benefit of provisional Application No. 60/054,800, filed Jul. 31, 1997.

FIELD OF THE INVENTION

The invention relates to a connector that aligns optical fibers relative to a mating end of the connector. Further, the invention relates to a connector having a float mounted connector body that aligns optical fibers relative to a mating end of the connector. Further, the invention relates to a connector having a mating end that is sealed.

BACKGROUND OF THE INVENTION

Attempts have been made to substitute optical fibers for electrical contacts, for example, pins and mating sockets, in an electrical connector, for example, a connector specified by a technical specification, such as IEE 38999. The constituent parts of the electrical connector vary in dimensions within allowable dimensional tolerances. When the parts are assembled together, the tolerances become cumulative, such that connectors that are formed by an assemblage of the constituent parts have dimensional variations. Electrical pin and socket contacts mate together with a sliding telescopic fit, which readily adjusts telescopically to compensate for dimensional variations due to the cumulative tolerances. However, optical fibers mate by end on end alignment. The optical fibers require precise alignment relative to a mating end of a connector. In the past, such a connector lacked adequate adjustment to compensate for dimensional variations due to cumulative tolerances. Such a connector has been inadequate to precisely align and position optical fibers relative to a mating end of the connector. Further, subjecting the connector to vibration has undesirably disturbed the alignment of the optical fibers in the connector.

Further, the invention relates to a desired feature of a sealed connector body that protects an interface, at which optical fibers mate end to end. According to U.S. Pat. No. 4,687,291, alignment ferrules are spring biased by O-rings within a connector body of bipartite construction. The bipartite construction occurs along an open seam that lacks an environmental seal. The O-rings are incapable of providing an environmental seal when used in a connector body having the open seam. A sealed connector body protects the interface of mating optical fibers from contact with moisture and other contaminants. In the connector body are alignment ferrules terminating optical fibers, wherein the alignment ferrules are spring biased to extend along passages of the connector body. In the past, it has been difficult to provide environmental seals in the passages themselves.

SUMMARY OF THE INVENTION

The invention relates to alignment ferrules terminating optical fibers, wherein, the alignment ferrules are spring biased along passages of a connector body, and the passages are environmentally sealed. According to an embodiment, environmental seals encircle respective alignment ferrules, springs bias the seals toward respective collars on the alignment ferrules, and the environmental seals compress against the collars and compress against interiors of the passages to seal the passages. An exterior of the connector body is encircled by an environmental seal. The connector body is of one piece, unseamed construction.

The invention further relates to a connector body to align optical fibers with a mating connector body wherein, alignment ferrules terminate optical fibers, and wherein the alignment ferrules are aligned along passages through the connector body, and further wherein, the passages are environmentally sealed. According to an embodiment, environmental seals encircle respective alignment ferrules, springs bias the seals toward respective collars on the alignment ferrules, and the environmental seals compress against the collar and compress against interiors of the passages to seal the passages.

The invention further relates to a connector body to align optical fibers with a mating connector body wherein, the connector body is adapted to be mounted by floating suspension in an opening through a wall. According to an embodiment, a resilient member encircles the connector body, and the connector body is attached by the resilient member in floating suspension against an interior of an opening through the wall so as to float in response to vibration.

The invention further relates to a connector comprising, a connector body with aligned optical fibers, a wall against which the connector body is seated to maintain the connector body stationary during alignment with a mating connector body, and a resilient member encircling the connector body, and wherein, following unseating of the connector body by the application of pressure by the mating connector body, the connector body is attached by the resilient member in floating suspension against an interior of an opening through the wall so as to float in response to vibration.

Further according to the invention, a connector body aligns optical fibers relative to a mating end of a connector shell, such as a connector shell specified by a technical specification, IEEE 38999 for electrical connectors.

Embodiments of the invention will now be described with reference, by way of example, to the accompanying drawings, according to which:

DESCRIPTION OF THE DRAWINGS

FIG. 1 is an enlarged side view of a connector a optical fibers of an optical cable terminated with alignment ferrules, with certain parts shown partially cut away;

FIG. 2 is an enlarged side view of the connector, according to FIG. 1, assembled in a plug type connector;

DETAILED DESCRIPTION

Figure 3:
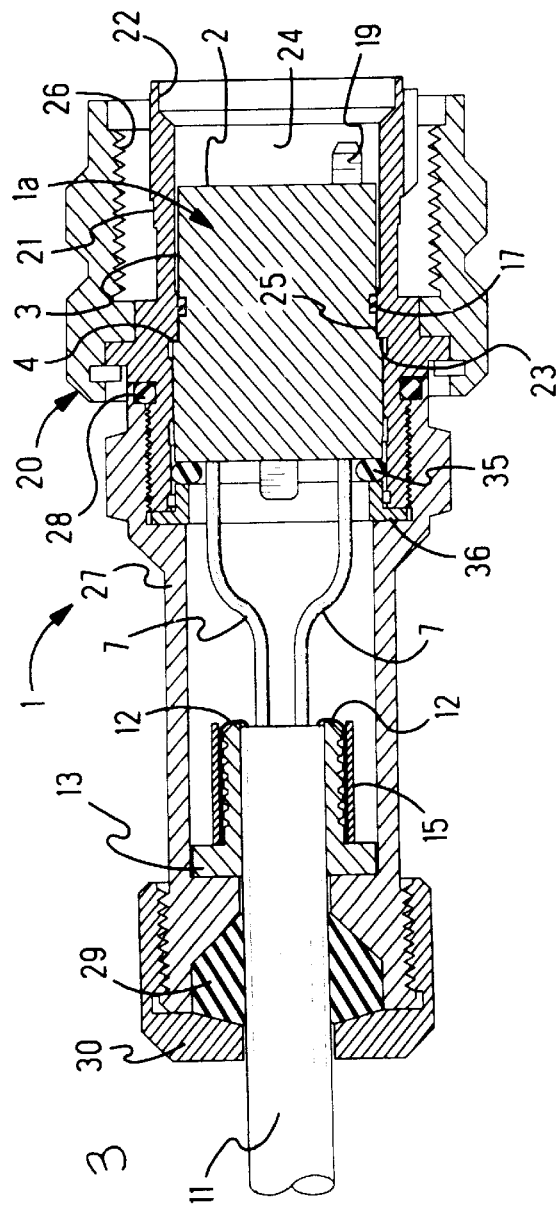
FIG. 3 is an enlarged side view in section of the connector, according to FIG. 1, assembled in another embodiment of a plug type connector.

With reference to FIGS. 1–6, a connector 1 will now be described. For example, the connector 1 comprises a connector body 1a of one piece, unseamed, machined metal construction, with a front mating end 2 and an outer circumference 3 that is stepped to provide a front facing shoulder 4. Ferrule receiving passages 5, FIGS. 1, 5 and 6, through the connector body 1a communicate with the mating end 2. Known alignment ferrules 6 are received for reciprocation in respective passages 5. The alignment ferrules 6 terminate respective, known optical fibers 7, in a known manner, which comprises the alignment ferrules 6 concentrically encircling respective optical fibers 7.

The alignment ferrules 6 and the optical fibers 7 are aligned along the passages 5 in precise positions relative to the mating end 2. Enlarged collars 8, FIGS. 1, 5 and 6, encircle respective alignment ferrules 6. Resilient springs 9 bias the collars 8, and bias the alignment ferrules 6 toward the mating end 2 of the connector body 1a. For example, the springs 9 comprise compressible coil springs encircling respective alignment ferrules 6. A ferrule retaining plate portion 10 is secured to a remainder of the connector body 1a.

The passages 5 continue through the plate portion 10, and have reduced circumferences to allow passage of the optical fibers 7 through the plate portion 10. The springs 9 are confined in the passages 5 by the plate portion 10. Ends of the springs 9 impinge the plate portion 10.

With reference to FIGS. 1–3, the optical fibers 7 are buffer covered, and project collectively from an optical cable 11 of known, standard construction. Each optical fiber 7 is encircled by a protective jacket 11a.

Figure 4:
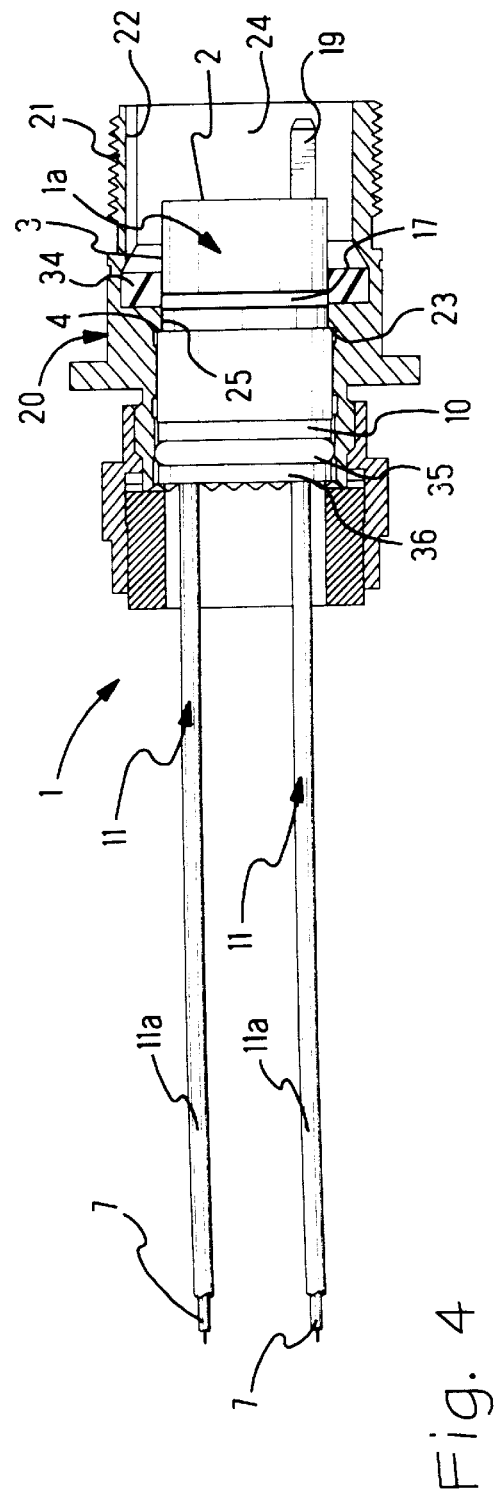
FIG. 4 is an enlarged side view in section of the connector, according to FIG. 1, assembled in a receptacle type connector suitable for use in a signal box.

When the standard construction cable 11 is too stiff for use in a signal box, for example, which requires short buffer covered fibers 7, each fiber 7 is protected by a loose protective tube 11a that surrounds a corresponding single optical fiber 7, as shown in FIG. 4. The protective tube 11a protects a short, buffer covered optical fiber 7 that is used internally of a signal box, not shown. The invention is intended to pertain to a cable 11 of standard construction, and to a cable 11 constructed with the protective tube 11a loosely surrounding a short length of buffer covered fiber 7.

With reference to FIGS. 1, 2 and 3, strength members 12 project axially within the jackets 11a covering respective buffer covered optical fibers 7. The jacket covered optical fibers 7 extend through openings in a tensile strain relief member 13 spaced rearwardly of the connector body 1a. With reference to FIGS. 1 and 2, the strain relief member 13 is secured to the connector body 1a, for example, by a threaded fastener 14. The strength members 12 extend from the jackets 11a covering respective optical fibers 7, and are doubled back on themselves to overlie the strain relief member 13. The strength members 12 are secured by a crimp ring 15 that clamps the strength members 12 against the strain relief member 13.

Figure 5:
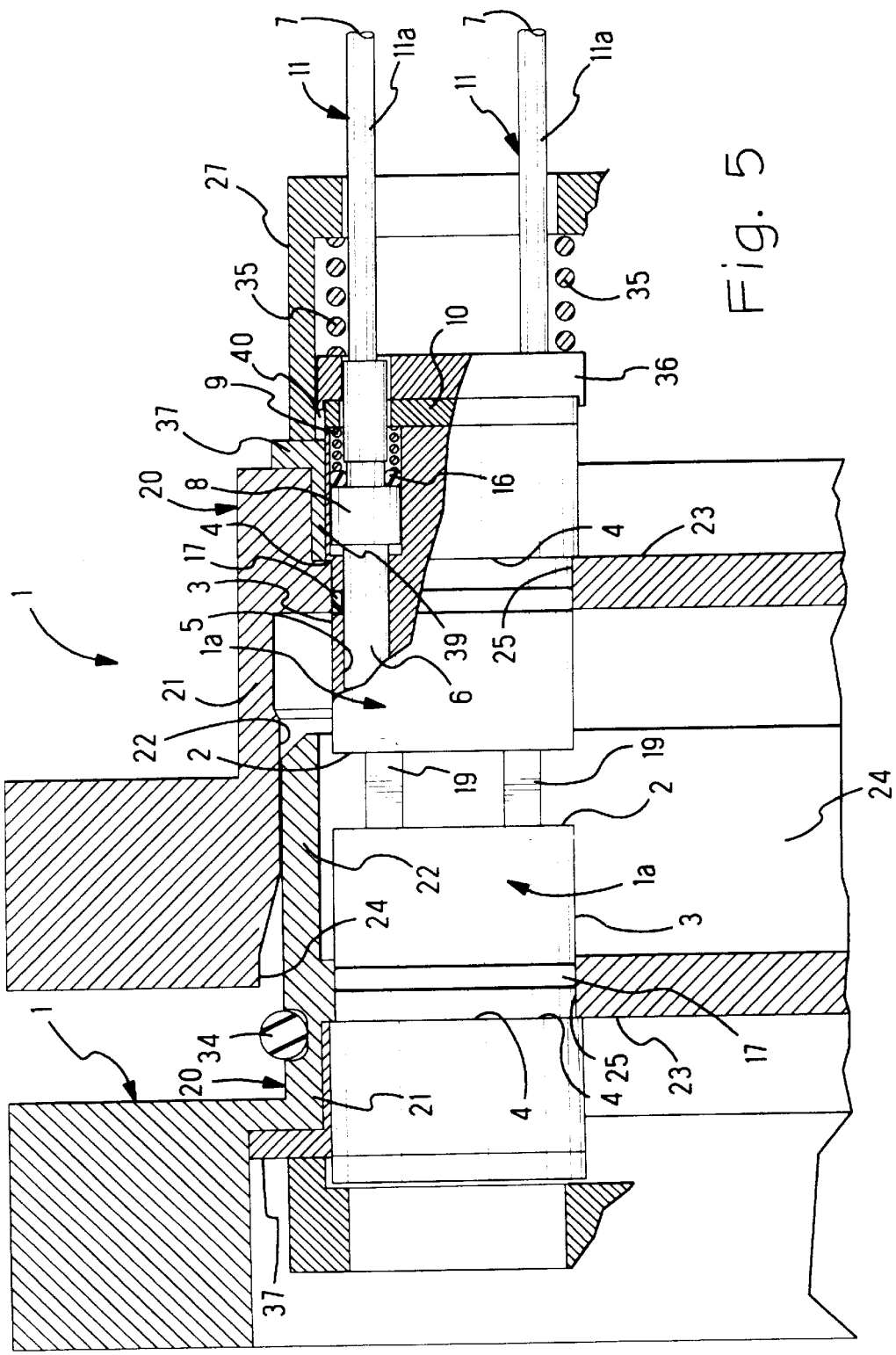
FIG. 5 is a fragmentary schematic view of a connector assembled in a multicavity connector, as shown in FIG. 7, and a mating connector assembled in a corresponding mating multicavity connector, with parts partially in section and with parts broken away.
Figure 6:
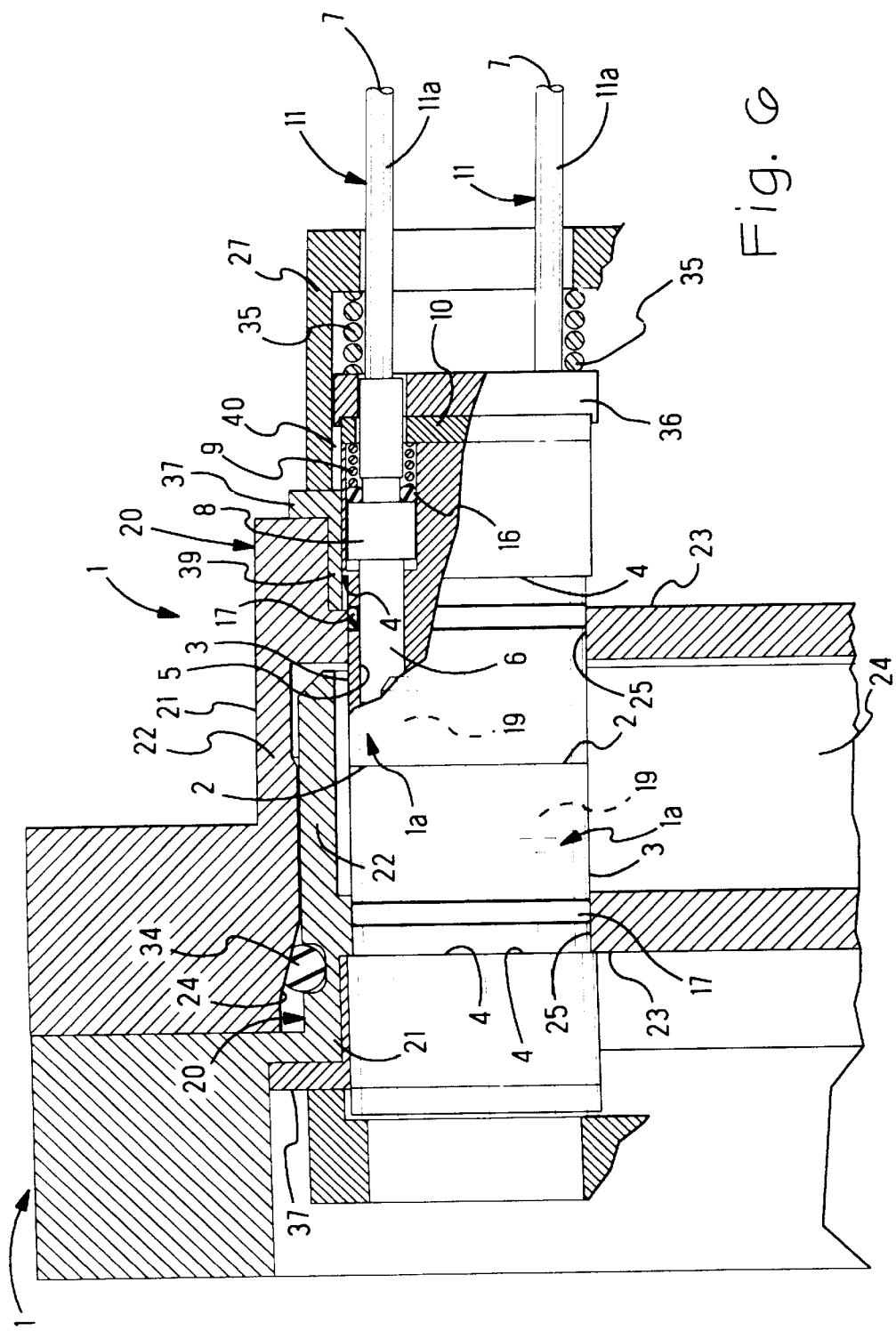
FIG. 6 is a view similar to FIG. 5, and further illustrating the connector and mating connector as fully mated together.

With reference to FIGS. 4, 5 and 6, the buffer covered optical fibers 7 are protected by the tubes 11a, which avoid the need for strength members 12. The tubes 11a are secured inside respective alignment ferrules 6 to provide tensile strain relief.

With reference to FIGS. 1–6, environmental seals 16 encircle respective alignment ferrules 6. For example, the environmental seals 16 comprise elastomeric O-rings.

The environmental seals 16 register in grooves encircling the exteriors of respective alignment ferrules 6. The environmental seals 16 are provided to seal between the alignment ferrules 6 and the passages 5. The resilient springs 9 bias the environmental seals 16 toward respective collars 8. The environmental seals 16 compress against the collars 8, and compress against interiors of the passages 5 to seal the passages 5. A sealed connector body 1a is provided. With reference to FIGS. 1–6, an environmental seal for the connector body 1a will be described. A resilient member 17 encircles the exterior 3 of the connector body 1a. The resilient member 17 seats in an exterior groove in the exterior 3 forwardly of the shoulder 4.

With reference to FIGS. 1–6, the connector body 1a establishes a mating connection with a mating connector body 1a. The mating connector body 1a and the connector body 1a are duplicates of one another. The mating connector body 1a has a construction that is a duplicate of the connector body 1a. The connector body 1a aligns ends of the optical fibers 7 with ends of the optical fibers in the mating connector body 1a, to transfer optical signals across a mating connection of the connector body 1a and the mating connector body 1a. The ends of the optical fibers 7 directly oppose one another across a mating connection. Alternatively, a known spherical lens 18, FIG. 1, is located in front of a corresponding optical fiber 7 and within the mating end 2 of the connector body 1a. An optical signal emanating from an optical fiber 7 diverges conically. The diverging signal transmits through the lens 18 and emerges parallel. This signal is captured by a second lens 18 in front of a receiving optical fiber 7. The second lens 18 focuses the signal to a spot size that matches the transmitting core size of the receiving optical fiber 7.

With reference to FIG. 1, for example, a projecting alignment finger 19 is on the mating end 2 of the connector body 1a. With reference to FIG. 5, the alignment finger 19 partially enters the mating connector body 1a to align the connector body 1a prior to completing the mating connection with the mating connector body 1a. With reference to FIG. 6, the alignment finger 19 fully enters the mating connector body 1a upon completion of the mating connection. The connector body 1a and the mating connector body 1a are fully mated, establishing a mating connection, when the mating end 2 of the connector body 1a directly impinges on the mating end 2 of the mating connector body 1a. Similarly, a projecting alignment finger 19 on the mating connector body 1a partially enters the connector body 1a prior to mating connection, followed by fully entering the connector body 1a when mating connection is established.

The connector 1, as shown in FIG. 1, and a duplicate mating connector 1 are capable of mating connection with each other. In addition, the connector body 1a can be assembled into different connectors 20, as shown in FIGS. 2–7. With reference to FIGS. 2–7, embodiments of a connector 20 will now be described. Each connector 20 comprises, a connector housing 21, also known as a shell, having an exterior flange 22 and a wall 23. The wall 23 is an interior, rear facing, wall of the connector housing 21. The flange 22 encircles an open mating end 24 of the connector 20. The flange 22 aligns telescopically with a corresponding flange 22 on a mating connector 20 to align the connectors 20 prior to completing a mating connection of the connector 20 with the mating connector 20.

Figure 7:
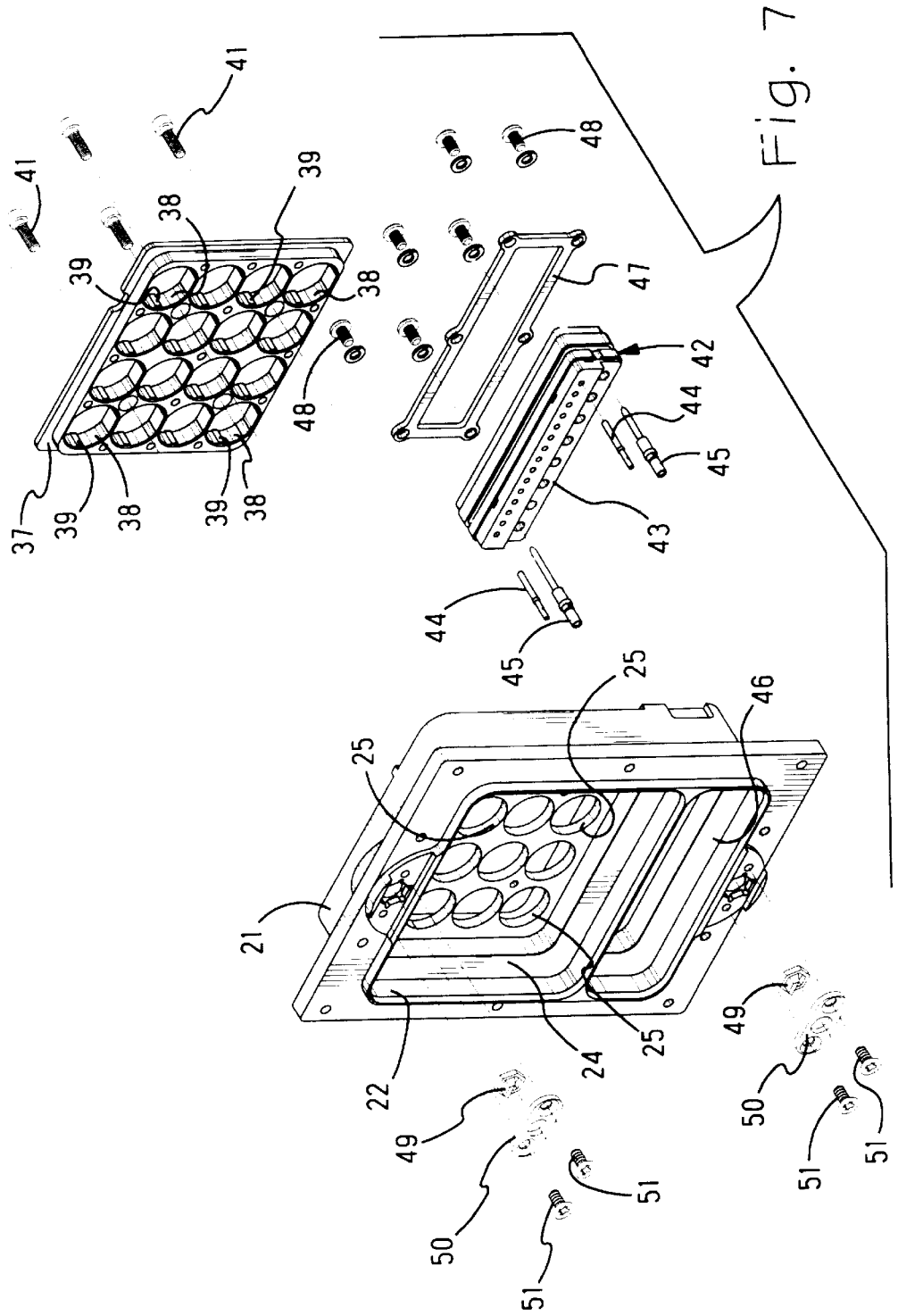
FIG. 7 is an isometric view of a multicavity connector with parts separated from one another, and further illustrating, a connector shell to which are mounted, front polarizing keys, a keying plate and an electrical connector block.
Figure 8:
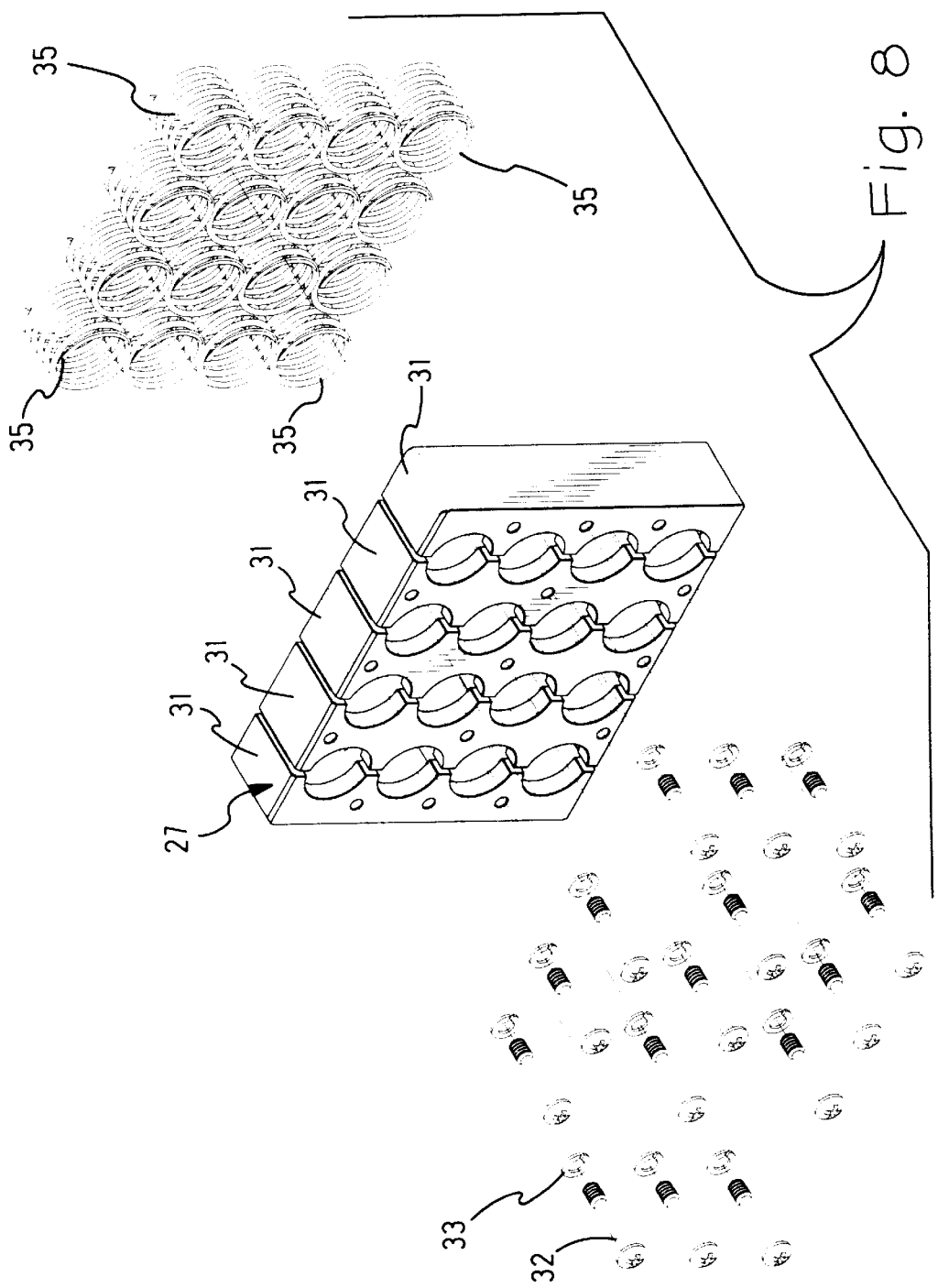
FIG. 8 is an isometric view of coil biasing springs and segmented parts of a hold down plate for retaining the biasing springs in the multicavity connector as shown in FIGS. 5–7.
Figure 9:
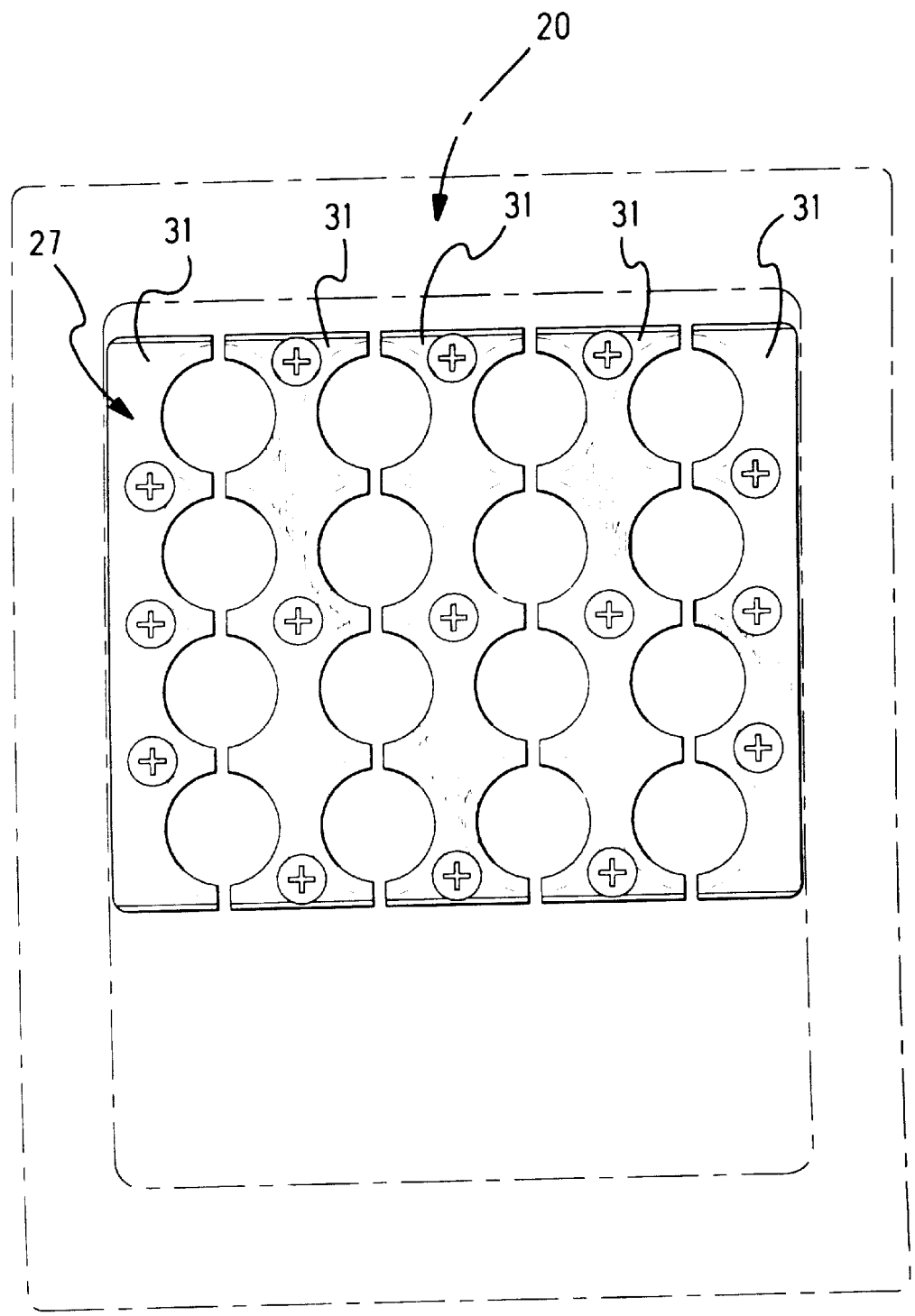
FIG. 9 is an end view of the hold down plates aligned with a connector housing shown by broken lines.
Figure 10:
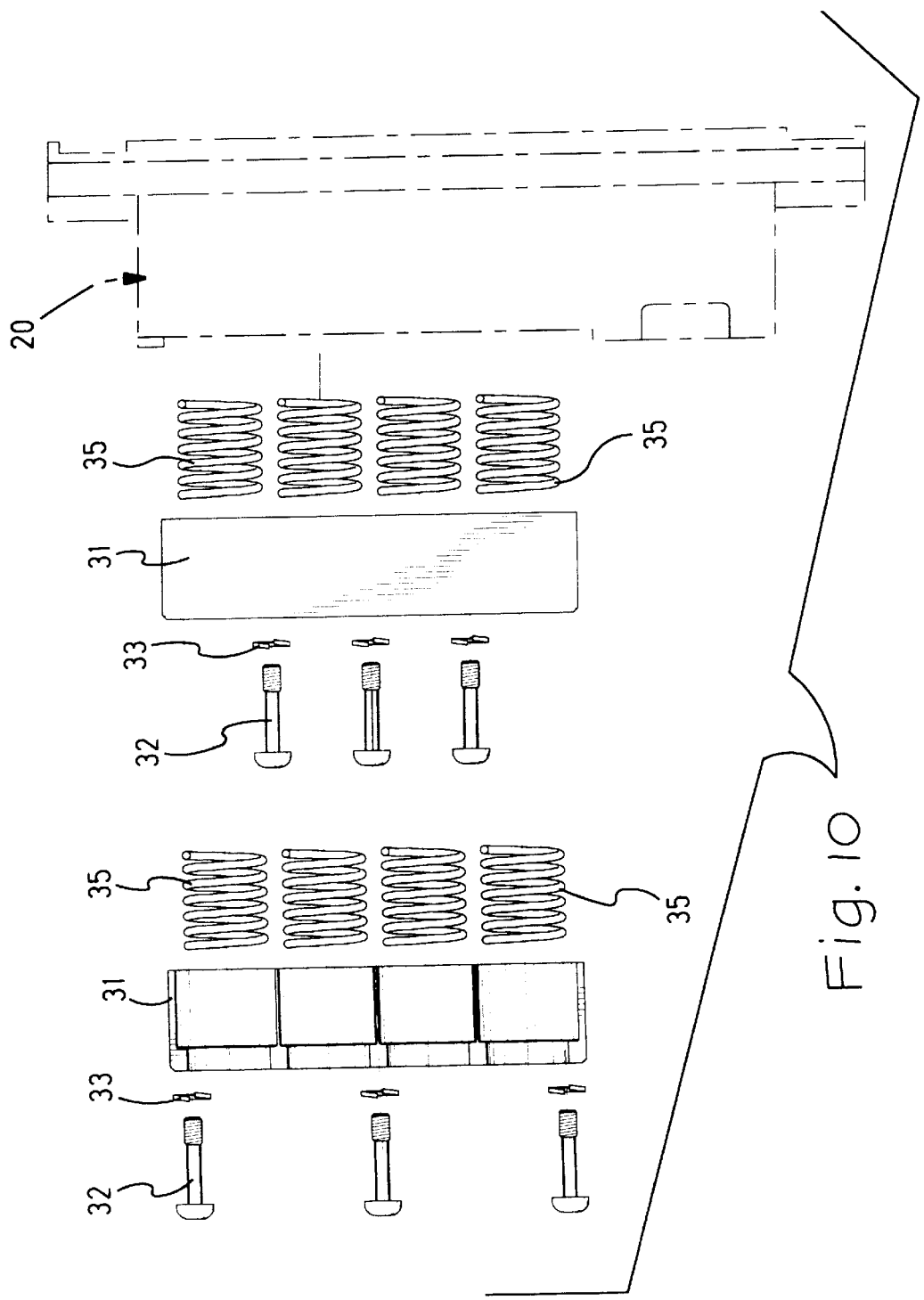
FIG. 10 is a side view of the hold down plates and coil biasing springs, according to FIG. 8, aligned with a connector housing shown by broken lines.

At least one opening 25 through the wall 23, as shown in FIGS. 2–7, receives a corresponding connector body 1a. With reference to FIG. 7, each additional opening 25 is provided to receive a corresponding connector body 1a.

A circular receptacle type connector 20, shown in FIG. 4, establishes a mating connection with a circular plug type connector 20, for example, as shown in each of FIGS. 2 and 3. The connector housing 21 on the receptacle type connector 20 is externally threaded to couple with an internally threaded coupling nut 26 mounted for rotation on the plug type connector 20, as shown in FIGS. 2 and 3.

A hollow backshell 27, FIGS. 2 and 3, encircles the cable 11 and the tensile strain relief member 13. The backshell 27 is coupled to a rear of the connector housing 21. An environmental seal 28 seals between the backshell 27 and the connector housing 21. A compressible seal 29 encircles the cable 11, and seals between the cable 11 and the backshell 27. An internally threaded nut 30, through which the cable 11 passes, is threadably secured to a rear end of the backshell 27 to compress and retain the seal 29. The seal 29 provides bending strain relief for the cable 11. With reference to FIGS. 4. 5 and 6, a backshell 27 is absent, as not being required for use of this embodiment of the connector body 1a in a signal box. With reference to FIGS. 5, 6 and 8–10, the backshell 27 is in the form of segmented hold down plates 31 coupled to the corresponding connector housing 21, for example, by threaded fasteners 32 and lock washers 33.

With reference to FIGS. 4, 5 and 6, a compressible member 34 is in compression between the connector 20 and the mating connector 20 to provide an environmental seal therebetween. The fully mated ends 2 of the connector body 1a and mating connector 20 are sealed by a combination of the compressible member 34, the resilient member 17 between the connector body 1a and the wall 23, and the environmental seals 16 between the alignment ferrules 6 and the passages 5.

With reference to FIGS. 2–6, the resilient member 17 is in compression diametrically between the connector body 1a and an interior of a corresponding opening 25 through the wall 23 to provide an environmental seal. The resilient member 17 is in front of the forward facing shoulder 4 on the exterior of the connector body 1a.

With reference to FIG. 5, the connector body 1a is seated against the wall 23 by engaging the forward facing shoulder 4 against a rear of the wall 23. The connector body 1a is seated against the wall 23 to maintain the connector body 1a stationary during alignment of the connector body 1a with a mating connector body 1a, and prior to partial insertion of the alignment pin 19 into a mating connector body 1a.

With reference to FIG. 6, a floating suspension of the connector body 1a will be described. The connector body 1a no longer remains stationary, but is unseated from the wall 23 by pressure being applied by impinging the mating connector body 1a. The connector body 1a becomes unseated by moving rearward relative to the wall 23. The resilient member 17 remains, and provides a seal, between the unseated connector body 1a and the opening 25 through the wall 23. The resilient member 17 moves rearward together with the unseated connector body 1a. The unseated connector body 1a is attached by the resilient member 17 in floating suspension while supported by the resilient member 17 against an interior of the opening 25. While in floating suspension, the connector body 1a is free to move by reciprocation along three orthogonal axes of movement, so as to float in the opening 25. The resilient member 17 will deflect resiliently in response to movement of the connector body 1a along said three axes of movement. During a process of establishing mating connection, the connector body 1a will float to adjust a position of the alignment pin 19 to compensate for misalignment of the alignment pin 19 as it impinges and enters the mating connector body 1a. The connector body 1a will float to adjust the mating end 2 of the connector body 1a directly against the mating end 2 of the mating connector body 1a.

To maintain a mating connection with the mating connector body 1a, the connector body 1a will float in response to vibration. The floating suspension relieves a tendency for the connector body 1a and the optical fibers 7 to become undesirable dislodged from their desired alignments in the mating connection.

With reference to FIGS. 2–4, in the backshell 27 is at least one resiliently compressible member 35, together with a spacer 36, or shim, between the backshell 27 and the plate 10 at a rear of the connector body 1a. In each of the plug type connectors 20, FIGS. 2 and 3, and in the receptacle type connector 20, FIG. 4, each resiliently compressible member 35 comprises, for example, a resilient O-ring biasing the connector body 1a forwardly to seat against a corresponding wall 23.

With reference to FIGS. 5, 6 and 8–10, in at least one backshell 27 are multiple resiliently compressible members 35, together with a spacer 36, or shim, between the backshell 27 and the plate 10 at the rear of the connector body 1a. The compressible members 35 comprise, for example, coil springs biasing each connector body 1a forwardly to seat against a corresponding wall 23. corresponding connector bodies 1a unseat from corresponding walls 23 against the bias by the corresponding resiliently compressible members 35. The resiliently compressible members 35 deflect resiliently in response to movement of the connector body 1a along said three axes of movement.

With reference to FIGS. 2–4, the unseated connector body 1a is attached by the resiliently compressible member 17 in floating suspension while supported by the member 17 against an interior of the opening 25. The connector body 1a, when fully mated with an impinging mating connector body 1a, undergoes a known displacement. A mating force between the mating ends 2 of the fully mated connector bodies 1a is controlled by selecting the spring rate of the corresponding resiliently compressible members 35.

With reference to FIG. 7, the connector housing 21 has multiple openings 25, each adapted to receive a corresponding connector body 1a. A connector 20, having the multiple openings 25 comprises, a multicavity connector. A flanged keying plate 37 has corresponding multiple cavities 38 aligned with the openings 25. Each of the cavities 38 has a projecting key 39 aligned with a corresponding opening 25. A connector body 1a in a corresponding opening 25 has a recessed lengthwise keyway 40, FIGS. 5 and 6, that slidably receives a corresponding key 39 to orient the connector body 1a. A loose registration of the key 39 in the keyway 40 allows for the floating suspension of the connector body 1a in the opening 25. The keying plate 37 is secured to the housing 21, for example, by threaded fasteners 41.

With reference to FIG. 7, a known electrical connector 42 comprises, an insulating housing block 43 and conducting pins 44 and conducting sockets 45. The connector 42 is received by a cavity 46 in the housing 21. The connector 42 is secured to the housing 21, for example, by a rear mounted bezel 47 through which threaded fasteners 48 pass and secure to the housing 21.

Projecting polarizing keys 49 are offset mounted on a hexagon shaped base. Mounting plates 50 are secured by threaded fasteners 51 to a front of the housing 21 to hold the polarizing keys in a desired orientation.

Although preferred embodiments of the invention have been described, other embodiments and modifications are intended to be covered by the spirit and scope of the appended claims.

What is claimed is:

1. A connector comprising: at least one connector body with aligned optical fibers, a wall on the connector against which the connector body is seated to maintain the connector body stationary during alignment with a mating connector body, and a resilient member encircling the connector body, wherein, following unseating of the connector body by the application of pressure by the mating connector body, the connector body is attached by the resilient member in floating suspension against an interior of an opening through the wall so as to float in the opening in response to vibration, alignment ferrules are aligned along passages through the connector body, the alignment ferrules terminate respective optical fibers, environmental seals encircle respective alignment ferrules, resilient springs bias the environmental seals toward respective collars on the alignment ferrules, and the environmental seals compress against the collars and compress against interiors of the passages to seal the passages.

2. A connector as recited in claim 1, and further wherein, a projecting key aligns with the opening through the wall, and a recessed keyway in the connector body receives the key to prevent rotation of the connector body.

3. A connector as recited in claim 1, and further wherein, a keyed opening in the connector housing aligns with the opening through the wall of the connector housing, and the connector body and the keyed opening provide a combination of a projecting key aligned with a recessed keyway to prevent rotation of the connector body.

4. A connector as recited in claim 1, and further wherein, a projecting key aligns with the opening through the wall, and a recessed keyway in the connector body receives the key to prevent rotation of the connector body, the resilient member being adjacent to the key.

5. A connector as recited in claim 1, and further wherein, a projecting key aligns with the opening through the wall, a recessed keyway in the connector body receives the key to prevent rotation of the connector body, and the resilient member being slidable along the opening toward the key.

6. A connector as recited in claim 1, and further wherein, a resiliently deformable member biases the connector body, and the connector body unseats from the wall against a bias of the resiliently deformable member.

7. A connector as recited in claim 1, and further wherein, the springs bias the alignment ferrules toward a mating end of the connector body.

8. A connector body to align optical fibers with a mating connector body, comprising: alignment ferrules terminating optical fibers, wherein the alignment ferrules are aligned along passages through the connector body, and further, wherein the passages are environmentally sealed, whereby, environmental seals encircle respective alignment ferrules, springs bias the environmental seals toward respective collars on the alignment ferrules, and the environmental seals compress against the collar and compress against interiors of the passageways to seal the passages.

9. A connector body as recited in claim 8 wherein, the springs bias the alignment ferrules toward a mating end of the connector body.

10. A connector body as recited in claim 8 wherein, a resilient member encircles the connector body and provides an environmental seal.

11. A connector body as recited in claim 8 wherein, a resilient member encircles the connector body, and the connector body is attached by the resilient member in floating suspension against an interior of an opening in a wall so as to float in response to vibration.

12. A connector body as recited in claim 10 wherein, the resilient member is in front of a forward facing shoulder on the connector body.

* * * * *